United States Patent
Kirkby et al.

(10) Patent No.: US 10,417,318 B2
(45) Date of Patent: *Sep. 17, 2019

(54) TREATMENT CONTROLLER

(71) Applicant: Accenture Global Services Limited, Dublin (IE)

(72) Inventors: Stephen Denis Kirkby, Unley Park (AU); Claudio Natoli, Glenwood (AU); Peter Kellett, Kilburn (AU); Ronald Van Ryswyk, Netley (AU); Stephanus Mark Van Schalkwyk, St. Louis, MO (US)

(73) Assignee: ACCENTURE GLOBAL SERVICES LIMITED, Dublin (IE)

(*) Notice: Subject to any disclaimer, the term of this patent is extended or adjusted under 35 U.S.C. 154(b) by 144 days.

This patent is subject to a terminal disclaimer.

(21) Appl. No.: 15/359,320

(22) Filed: Nov. 22, 2016

(65) Prior Publication Data

US 2017/0075871 A1   Mar. 16, 2017

Related U.S. Application Data

(63) Continuation of application No. 13/222,460, filed on Aug. 31, 2011, now Pat. No. 9,558,285.

(Continued)

(51) Int. Cl.
*G06F 17/30* (2006.01)
*G06Q 30/02* (2012.01)
(Continued)

(52) U.S. Cl.
CPC ........ *G06F 17/2247* (2013.01); *G06F 16/958* (2019.01); *G06Q 30/02* (2013.01);
(Continued)

(58) Field of Classification Search
CPC .......... G06F 17/2235; G06F 17/30905; G06F 17/30017; G06F 17/30058; G06F 15/16; G06F 15/163
See application file for complete search history.

(56) References Cited

U.S. PATENT DOCUMENTS 5,987,480 A   11/1999   Donohue et al.
6,076,166 A   6/2000   Moshfeghi et al.
(Continued)

FOREIGN PATENT DOCUMENTS

WO   00/70511 A1   11/2000
WO   02/063420 A2   8/2002

OTHER PUBLICATIONS

European Patent Office, "Search Report on EP Application No. 11007489", dated Feb. 21, 2012.

*Primary Examiner* — Stephen S Hong
*Assistant Examiner* — Ahamed I Nazar
(74) *Attorney, Agent, or Firm* — Mannava & Kang, P.C.

(57) ABSTRACT

A content modification system includes a treatment controller which may be hosted at a web server. The treatment controller receives a request for content from a user. One example of a request is an HTTP request for a web page. The treatment controller determines a representation of the requested content and receives a modification instruction for modifying the requested content. The treatment controller is operable to modify the representation according to the instructions and render the representation to a predetermined format for delivery to the user.

17 Claims, 4 Drawing Sheets

Related U.S. Application Data

(60) Provisional application No. 61/382,662, filed on Sep. 14, 2010.

(51) Int. Cl.
*H04L 29/08* (2006.01)
*G06F 17/22* (2006.01)
*G06F 16/958* (2019.01)

(52) U.S. Cl.
CPC ............ *H04L 67/02* (2013.01); *H04L 67/04* (2013.01); *H04L 67/2823* (2013.01)

(56) References Cited

U.S. PATENT DOCUMENTS

| | | | |
|---|---|---|---|
| 6,128,655 A | 10/2000 | Fields et al. | |
| 6,311,185 B1 | 10/2001 | Markowitz et al. | |
| 7,574,486 B1 * | 8/2009 | Cheng | G06F 17/30905 707/999.01 |
| 2002/0138331 A1 * | 9/2002 | Hosea | G06F 17/30905 705/7.37 |
| 2002/0165881 A1 | 11/2002 | Shelton | |
| 2004/0025176 A1 | 2/2004 | Franklin et al. | |
| 2004/0205452 A1 | 10/2004 | Fitzsimons et al. | |
| 2004/0255233 A1 | 12/2004 | Croney et al. | |
| 2005/0204276 A1 | 9/2005 | Hosea et al. | |
| 2006/0031404 A1 | 2/2006 | Kassab | |
| 2006/0064339 A1 | 3/2006 | Allred | |
| 2006/0074769 A1 | 4/2006 | Looney et al. | |
| 2006/0074770 A1 | 4/2006 | Oreif et al. | |
| 2006/0143562 A1 | 6/2006 | Seurig et al. | |
| 2007/0005437 A1 * | 1/2007 | Stoppelman | G06Q 30/02 705/14.53 |
| 2007/0022442 A1 | 1/2007 | Gil et al. | |
| 2007/0067493 A1 * | 3/2007 | Issa | G06Q 30/02 709/246 |
| 2007/0220480 A1 * | 9/2007 | Waldman | G06F 17/2264 717/106 |
| 2007/0234201 A1 | 10/2007 | Fukura et al. | |
| 2007/0239528 A1 | 10/2007 | Xie et al. | |
| 2008/0072147 A1 * | 3/2008 | Brown | G06Q 10/10 715/273 |
| 2008/0082911 A1 | 4/2008 | Sorotokin et al. | |
| 2008/0140728 A1 | 6/2008 | Fraser et al. | |
| 2008/0154951 A1 * | 6/2008 | Martinez | G06Q 30/02 |
| 2008/0195938 A1 * | 8/2008 | Tischer | H04N 7/165 715/255 |
| 2008/0201206 A1 * | 8/2008 | Pokorney | G06Q 30/02 705/7.29 |
| 2008/0307454 A1 * | 12/2008 | Ahanger | G06Q 30/02 725/36 |
| 2009/0013347 A1 | 1/2009 | Ahanger et al. | |
| 2009/0070485 A1 * | 3/2009 | Barger | G06F 17/27 709/236 |
| 2010/0094682 A1 * | 4/2010 | Symons | G06Q 30/0205 705/7.34 |
| 2010/0145794 A1 * | 6/2010 | Barger | G06F 17/30867 705/14.45 |
| 2010/0293054 A1 | 11/2010 | Lieberman | G06Q 30/02 705/14.54 |
| 2010/0313183 A1 * | 12/2010 | Ellen | G06Q 30/02 717/110 |
| 2011/0055045 A1 * | 3/2011 | Smith | G06Q 30/0621 705/26.5 |
| 2012/0124462 A1 * | 5/2012 | Bannoura | G06F 9/45516 715/234 |
| 2012/0124555 A1 * | 5/2012 | Bannoura | G06F 8/443 717/123 |

* cited by examiner

TREATMENT CONTROLLER

PRIORITY

The present is a Continuation of commonly assigned and co-pending U.S. patent application Ser. No. 13/222,460, filed Aug. 31, 2011, which application claims priority to U.S. Provisional Patent Application Ser. No. 61/382,662 filed Sep. 14, 2010, the disclosures of which are hereby incorporated by reference in their entireties.

BACKGROUND

In some instances, content providers may desire to deliver different web pages to different users or different categories of users. In one example, an online retailer may conduct online experiments to determine which web page is most successful in achieving a sale or some other objective. To conduct the experiment, different treatments are delivered to browsers of users in different control groups and their actions are captured. A treatment is content that is presentable online to a user, for example, via a browser, but has one or more features that can be varied so different variations of the treatment can be tested or otherwise presented. The treatment may include an online advertisement or a web page or any component of a web page that has one or more attributes, such as color, size, shape, location, text, etc., that can be varied. The treatment is presented to the users. Then, their actions, in response to the treatment, are tracked using the IDs generated from their browser attributes and possibly other user device attributes. The captured actions may be used to determine the effectiveness of different treatments.

In another example, once the most successful treatment are identified for a group, that treatment is used to configure other content similarly for delivery to the group. Thus, different treatments may be presented to different groups of users. These are some examples whereby different web pages may be delivered to different users.

To implement a system that can re-configure a web page on-the-fly can be difficult, especially in real-time without undue delay for presenting the web page to the user.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a treatment controller located at a web server is configured to deliver different web pages including different treatments to different users or groups of users. A treatment is content that is presentable online to a user, for example, via a browser, but has one or more features that can be varied so different variations of the treatment can be tested or otherwise presented. The treatment may include an online advertisement or a web page or any component of a web page that has one or more attributes, such as color, size, shape, location, text, etc., that can be varied. The treatment controller performs real time dynamic page manipulation, for example, through modification of web control attributes using a render object model. The treatment controller logically sits between the web server and an optimization service and identifies which parts of a web page can be changed and then uses rules and instructions received from the optimization service in order to modify the content on the fly. The modified web page is delivered to the user's browser from the web server.

The treatment controller allows dynamic optimization of web pages without intrusion of scripts on the user's browser. For example, JavaScript running on a browser is commonly used to display web pages on a web browser. However, JavaScript is visible to the user, so users can view the scripts to identify modifications to web pages if treatments were rendered through JavaScript. This could influence the user's behaviour negatively, which may obfuscate any benefit that could have been derived from a treatment. Furthermore, if a browser does not run JavaScript, then the treatments could not be generated through JavaScript.

Figure 1:
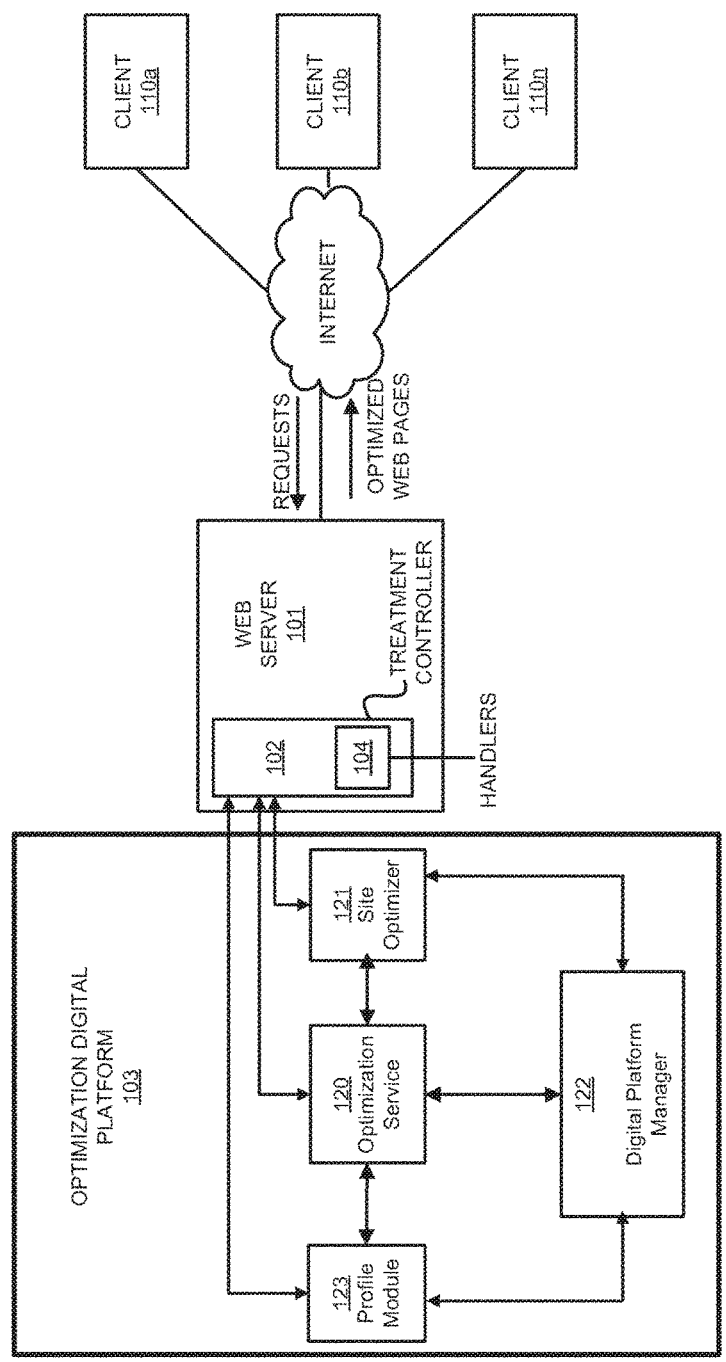
FIG. 1 illustrates a system, according to an embodiment.

FIG. 1 illustrates a system 100, according to an embodiment. The system 100 includes web server 101, which may host a treatment controller 102, or the treatment controller is hosted on another server connected to the web server 101. The web server 101 receives web page requests from the users 110*a-n* and delivers the requested web pages to the users 110*a-n* via the Internet. The users 110*a-n* have user devices, such as personal computers, smart phones, etc., to send HTTP requests for web pages to the web server 101 and display web pages received in response to the requests on the devices. The devices may include browsers for displaying web pages. The users or their devices are also referred to as clients.

The treatment controller 102 passes a request for a web page along with a unique ID for a client to the optimization digital platform 103. The optimization digital platform 103 may store rules for modifying web pages to generate an optimized web page for the user. An optimized web page may include a web page that is modified according to rules or instructions determined by the optimization digital platform 103. The optimization digital platform 103, for example, using stored rules and a profile for the user, identifies web page modifications and sends information for the modifications to the treatment controller 102. The treatment controller 102 modifies the web page and provides the modified web page to the web server 101, which delivers the modified web page to the client.

The optimization digital platform 103 may comprise an optimization service 120, a site optimizer 121, a digital platform manager 122, a profile module 123 and a data storage 124. The components of the optimization digital platform 103 are shown in a single platform. However, the components may operate on their own computer systems and have their own data storage. For example, the optimization service 120, the site optimizer 121, the digital platform manager 122 and the profile module 123 may each run on their own server or set of servers and communicate via a network. The data storage 124 may include one or more databases or other storage systems. The data storage 124 stores any data used by the optimization digital platform 103. The data storage 124 may comprise multiple data storages for the components of the optimization digital platform 103. For example, each of the optimization service 120, the site optimizer 121, the digital platform manager 122 and the profile module 123 may have their own data storage or share data storage. Also, the optimization digital platform 103 and its components may include software running on a computer system including hardware.

The optimization service 120 provides content and instructions to modify the content to the treatment controller 102. The content, for example, includes web pages to be provided to the users 110a-n in response to HTTP requests from the users 110a-n receives at the web server 101. The content to be modified that is provided to the treatment controller 102 may be represented in a data structure, such as a control tree. Handlers 104 at the treatment controller 102 are executed to interface with the control tree and perform the modifications indicated in the modification instructions.

The optimization service 120 also interfaces with the digital platform manager 122 to determine the modification instructions to send to the treatment controller 102. The digital platform manager 122 selects content to be provided to the users 110a-n in response to their requests. For example, the digital platform manager 122 receives the requests from the users 110a via the optimization service 120. The digital platform manager 122 determines content to be provided to the users 110a-n based on profiles for the users 110a-n or other factors. User profiles may be stored in the data storage 124. The profile module 123 may identify a user from data received with the user requests, and retrieve the profile for the user from the data storage 124 to provide to the digital platform manager 122. The digital platform manager 122 may use rules and conditions stored in the data storage 124 and user attributes from a profile to select content to send to the user. The content may include a treatment with attributes that are modifiable. The digital platform manager 122 may select one or more attributes to modify for the content according to the rules stored in the data storage 124. The digital platform manager 122 sends an indication of the attributes and elements of the content to modify to the optimization service 120, and the optimization service 120 sends modification instructions to the treatment controller 102 according to the modifications specified by the digital platform manager 122.

The digital platform manager 122 may also instruct the treatment controller 102, via the optimization service 120, to capture online user behaviour or other information pertaining to the users 110a-n. For example, the treatment controller 102 may be instructed to capture user behaviour in response to sending the modified content (i.e., the treatment) to the users 110a-n. This may include behaviour such as online purchases, subsequent click throughs, etc. This behaviour may be stored in the data storage 124 and used to determine whether a treatment is eliciting a desired response, such as whether the treatment influences a user to make a purchase or seek further product information.

The site optimizer 121 allows developers or other types of users to view treatments and make modifications to treatments. For example, a treatment may include modified text and images in a web page. A developer may view the web page with the modified text and images and make changes as needed so the web page conforms to desired standards.

Figure 2:
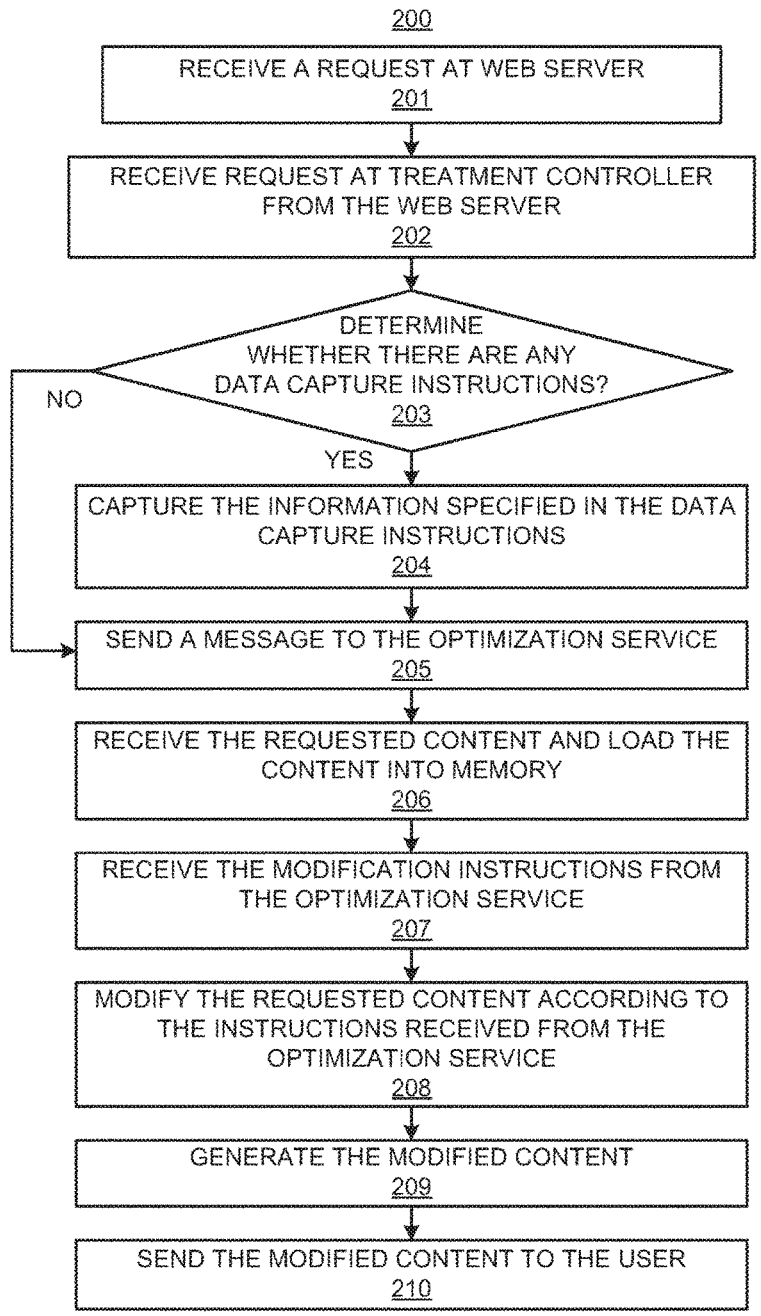
FIG. 2 illustrates a method for rendering a treatment, according to an embodiment.

FIG. 2 illustrates a flow chart of a method 200 for rendering a treatment comprised of modified content from a web server, according to an embodiment. The method 200 and a method 300 discussed below are described with respect to the system 100 shown in FIG. 1 by way of example. The methods may be practiced in other systems. Also, one or more of the steps may be performed in different orders than shown or performed substantially simultaneously.

At step 201, the web server 101 receives a request from, for example, the user 110a for content. The request may be an HTTP request for a web page.

At step 202, the treatment controller 102 receives the HTTP request from the web server 101.

At step 203, the treatment controller 102 determines whether there are any data capture instructions for the HTTP request. For example, the treatment controller 102 sends a message to the optimization service 120 to get data capture instructions, if any, that are related to the request or the user 110a. The optimization service 120 may send data capture instructions to the treatment controller 102 to capture the visitor ID, capture the query string in the HTTP, to capture profile data, to capture data related to purchases or to capture any other data associated with the user 110a or the HTTP request.

At step 204, the treatment controller 102 captures the information specified in the data capture instructions and sends the captured information to the optimization service 120. The treatment controller 102 may access a profile database to get user attributes for the user 110a sending the HTTP request. The user attributes may be sent to the optimization service 120. The digital platform manager 122 may use the user attributes and other information captured for the user to select a treatment. For example, if the captured data identifies the age of the user, the location of the user, and a product for which information is being requested, the digital platform manager 122 identifies a treatment according to those user attributes.

At step 205, the treatment controller 102 sends a message to the optimization service 120 to get content modification instructions. The message may include the user attributes and/or other data requested to be captured as described above at steps 203 and 204. The message for getting content modification instructions may be sent from the optimization service 120 to the digital platform manager 122, and the digital platform manager 122 determines the modifications to the content requested in the HTTP request from the user 110a, which is the new treatment. The optimization service 120 may receive an indication of the modifications for the new treatment specified by the digital platform manager 122, and generate modification instructions to be implemented by the treatment controller 102 so the treatment controller 102 can modify the requested content according to the instructions.

At step 206, the treatment controller 102 receives the requested content and loads the content into memory. The requested content may be received from the optimization service 120. In one embodiment, the treatment controller 102 receives a data structure from the optimization service 120 that is representative of the requested content at step 206. For example, the requested content may be a web page, and the data structure may include controls that identify elements (e.g., images, text, drop down menus, etc.) or sections of the content that can be modified according to modification instructions. In one example, the data structure comprises a control tree that may be generated using a web application framework, such as ASP.net. The data structure is a representation of the requested content. A control may be represented by other methods of encapsulating and identifying content, such as ASP.net form controls, model-view-controller (MVC) helper elements, etc.

At step 207, the treatment controller 102 receives the modification instructions from the optimization service 120 that specify how the requested content is to be modified to create the new treatment. Examples of instructions may include to change a link on a web page, redirect an entire web page, change text on a web page, change image on a web page, or change other attributes of a web page. For example, a control tree received at step 206 is loaded into memory, where it may be modified according to the instructions received at step 207. The modification instructions may specify modifications to controls in the control tree that will modify various elements of a requested web page.

At step 208, the treatment controller 102 modifies the requested content according to the instructions received from the optimization service 120 at 207. The treatment controller 102 reads each modification instruction to perform the instructed modifications on the content. If the modification instruction is for modifying an existing control in the control tree, the treatment controller 102 identifies the control in the control tree specified in the modification instruction. The instruction may specify a control ID if available, and the treatment controller 102 parses the control tree to identify the control ID for the control to be modified. In another example, the entire control syntax is specified in the modification instruction so the control to be modified can be identified from the control tree.

The modification instruction may specify to modify an attribute of the control. The treatment controller 102 modifies the attribute as indicated in the modification instruction. A software handler in the treatment controller 102 may use an application program interface for ASP.net to interface with the control tree and modify the attribute for the control. By way of example, the control to be modified may represent a link, text or an image in a web page. The attribute to be modified, for example, may be a new URL, new font size, or new image size. Another modification may be to add or remove a control. If a control is being added, the control location, and control attributes may be specified in the modification instruction so the treatment controller 102 can add the control in the control tree in the correct location. If a control is to be removed, the treatment controller 102 parses the control tree to find the control and removes it.

At step 209, the treatment controller 102 generates the modified content. For example, the control tree loaded into memory, which was modified at step 208, is rendered to generate HTML for a web page to be delivered to the user 110a. Rendering the control tree to generate the HTML is an example of converting the modified representation of the requested content to a format viewable by a user at a user device.

At step 210, the web server 101 sends the modified content to the user 110a. For example, the HTML is sent to a browser of the user device for the user 110a, and a web page is displayed via the browser. The web server 101 may continue to capture data for the user 110a after the modified content is sent to the user 110a. For example, the data capture instructions identified at step 203 may specify the treatment controller 102 to capture subsequent online behavior of the user 110a after the modified content is delivered to the user 110a. This may include storing actions, such as whether a purchase was made or an indication of other web pages visited by the user 110a. This information may be used to evaluate whether the modified content was effective in influencing the behavior of the user 110a as desired.

Figure 3:
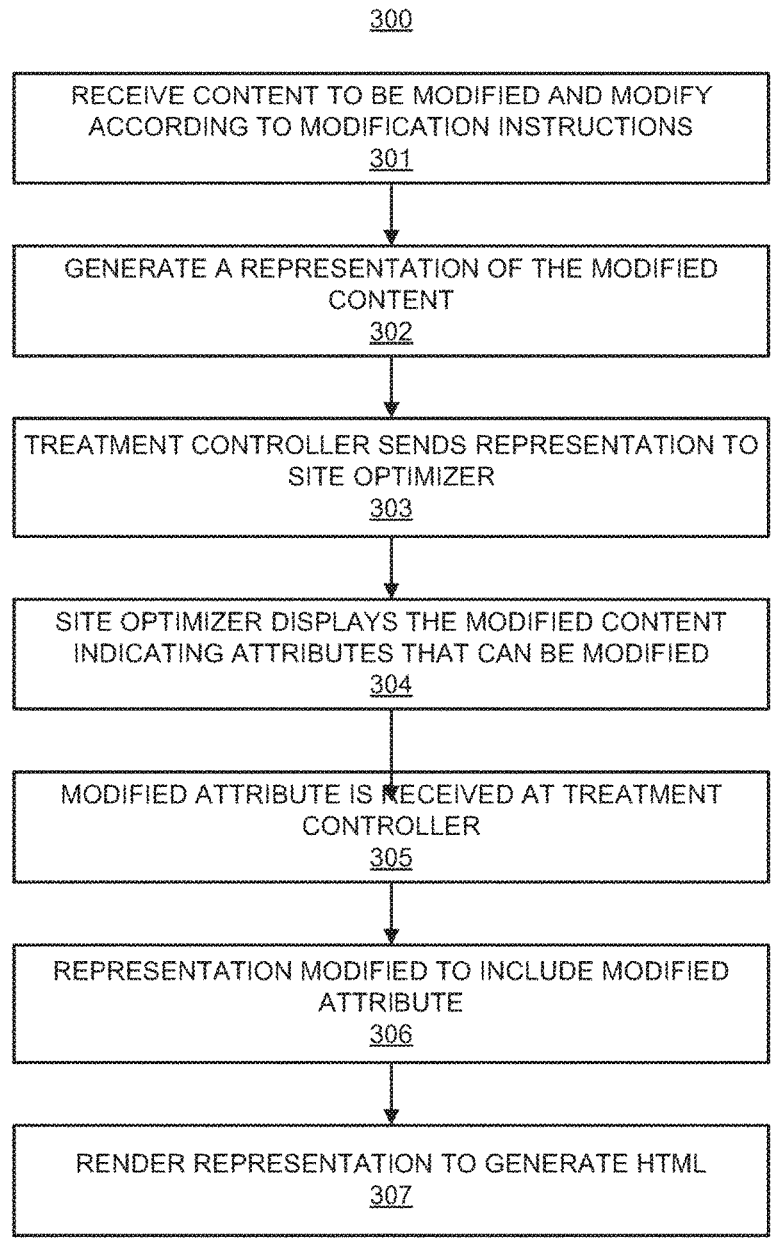
FIG. 3 illustrates a method for interfacing with a site optimizer to modify content, according to an embodiment.

FIG. 3 illustrates a flow chart of a method 300 for interfacing with the site optimizer 121 to modify content, according to an embodiment.

At step 301, the treatment controller 102 receives the content to be modified and modifies the content according to modification instructions, such as described above with respect to steps 206-208.

At step 302, the treatment controller 102 generates a representation of the modified content, and at step 303, the treatment controller sends the representation to the site optimizer 121. For example, the treatment controller 102 modifies the control tree according to the modification instructions, and the modified control tree is stored in memory, for example, at the web server 101. The treatment controller 102 generates an XML file from the control tree that indicates how the control tree maps to HTML that is rendered from the control tree. For example, the XML file specifies the attributes for each control. The XML file is sent to the site optimizer 121 from the treatment controller 102. The treatment controller 102 may also send the modified content (e.g., HTML generated from the modified control tree) to the site optimizer 121.

At step 304, the site optimizer 121 displays the modified content (e.g., a web page) and the XML indicates the attributes of the controls in the web page that can be modified. A web developer or another type of user may view the web page and make changes to the web page by modifying an attribute indicated in the HTML file.

At step 305, the modified attribute is received at the treatment controller 102. For example, the site optimizer 121 sends a message identifying any attributes modified by the developer to the treatment controller 102.

At step 306, the treatment controller 102 modifies the control tree to include the modified attribute received at step 305.

At step 307, the treatment controller 102 renders the control tree to generate the modified content in HTML, which includes the changes received from the site optimizer 121. Then, the modified content may be sent to the user 110a. The method 300 may be performed prior to step 210 of the method 200 to allow for a developer to make changes as needed.

Figure 4:
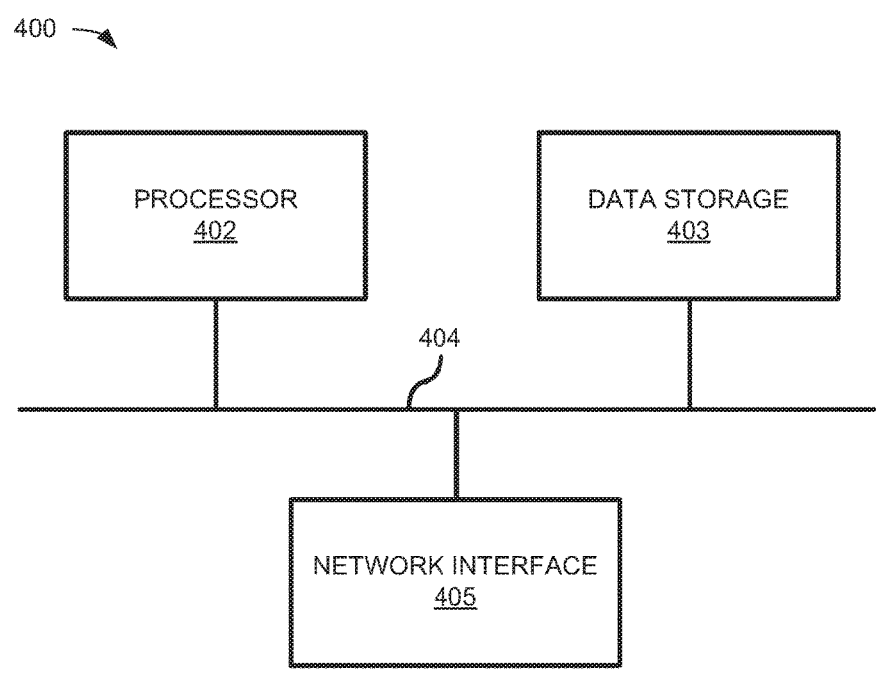
FIG. 4 shows a computer system that may be used as a hardware platform for one or more components of the system in FIG. 1, according to an embodiment.

FIG. 4 shows a computer system 400 that may be used as a hardware platform for one or more components of the system 100. The computer system 400 may be used as a platform for executing one or more of the steps, methods, modules and functions described herein that may be embodied as software stored on one or more computer readable mediums. The computer readable mediums may be non-transitory, such as storage devices including hardware.

The computer system 400 includes a processor 402 or processing circuitry that may implement or execute software instructions performing some or all of the methods, modules, functions and other steps described herein. Commands and data from the processor 402 are communicated over a communication bus 404. The computer system 400 also includes a computer readable storage device 403, such as random access memory (RAM), where the software and data for processor 402 may reside during runtime. The storage device 403 may also include non-volatile data storage. The computer system 400 may include a network interface 405 for connecting to a network. It will be apparent to one of ordinary skill in the art that other known electronic components may be added or substituted in the computer system 400.

One or more of the functions or steps described herein and one or more of the components of the systems described herein may be implemented as computer readable instructions stored on a computer readable medium, such as memory and/or other types of data storage that are non-transitory, and executed on a computer system, for example, by a processor, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments.

What is claimed is:

1. A content modification system comprising:
a processor; and
a storage device, the storage device including machine-readable instructions imbedded therein to cause the processor to:
receive, from a web server, an HTTP request from a user for content;
request data capture instructions identifying data to capture based upon the HTTP request, wherein the data to capture includes on-line user behavior including data related to online purchases associated with the user;
receive the data capture instructions;
capture the data in accordance with the received data capture instructions;
transmit a content modification request message to an optimization service, the content modification request message including the HTTP request for content from the user and the captured on-line user behavior;
in response to the transmitted content modification request message, receive from the optimization service:
a control tree representation of the requested content, wherein the control tree representation includes a plurality of controls representing elements of the requested content; and
a modification instruction comprising an indication to modify an attribute of a control of the plurality of controls in the control tree representation, wherein the optimization service determines the attribute of the control to modify based on the captured on-line user behavior;
identify, within the control tree representation, the control to be modified;
modify the attribute of the identified control in the control tree representation to generate a modified control tree representation of the requested content based upon the modification instruction;
convert the modified control tree representation to modified content in a user viewable format;
send the modified content to the user via the web server;
determine whether the data capture instructions include instructions to capture subsequent online user behavior after the modified content is delivered to the user; and
in response to a determination that the data capture instructions include instructions to capture subsequent online user behavior after the modified content is delivered to the user, continue to capture and store the on-line user behavior, and evaluate whether the modified content was effective in influencing the on-line user behavior of the user by storing actions including at least one of whether an online purchase was made and an indication of web pages, other than a web page of the modified content, visited by the user.

2. The content modification system of claim 1, wherein the processor is to convert the modified content to HTML, and the web server is to send the HTML to the user.

3. The content modification system of claim 1, wherein the modification instruction is to cause the processor to determine a location of a new control and attributes for the new control from the modification instruction, and insert the new control and the attributes in the modified content at the determined location.

4. The content modification system of claim 1, wherein the modification instruction is an instruction to cause the processor to remove a selected control, and the processor is to remove the selected control from the modified content.

5. The content modification system of claim 1, wherein the processor is further to:
determine attributes for the control in the modified content;
generate an XML file from the modified control tree representation specifying a mapping of the modified content to HTML;
send the XML file and the modified content to the optimization service, the optimization service to display the modified content and modifiable attributes of controls in the modified content according to the XML file;
receive an indication of a modification to an attribute of one of the attributes from the optimizer;
further modify the modified content to include the modification of the attribute; and
convert the further modified content to HTML.

6. The content modification system of claim 1, wherein the data to capture includes a visitor ID, a query string in the HTTP request, and user profile data.

7. The content modification system of claim 1, wherein the modification instruction received from the optimization service is received from a digital platform manager, the digital platform manager to determine the content to modify based on user profiles.

8. A method comprising:
receiving, from a web server, an HTTP request from a user for content;
requesting data capture instructions identifying data to capture based upon the HTTP request and the user;
receiving the data capture instructions, wherein the data to capture includes on-line user behavior including data related to online purchases associated with the user;
capturing the data in accordance with the received data capture instructions;
transmitting a content modification request message to an optimization service, the content modification request message including the request for content from the user and the captured data;

receiving, in response to the transmitted content modification request message:
  a control tree representation of the requested content, wherein the control tree representation includes a plurality of controls representing elements of the requested content; and
  a modification instruction comprising an indication to modify an attribute of an existing control of the plurality of controls in the control tree representation, wherein the optimization service determines the attribute of the existing control to modify according to the captured on-line user behavior;
identifying, within the control tree representation, the existing control to be modified;
modifying the attribute of the identified existing control in the control tree representation to generate a modified control tree representation of the requested content based upon the modification instruction;
converting the modified control tree representation of the requested content to modified content in a user viewable format sending the modified content in the user viewable format to the web server; and
in response to a determination that the data capture instructions include instructions to capture subsequent online user behavior after the modified content is delivered to the user, capturing and storing the on-line user behavior, and evaluating whether the modified content was effective in influencing the on-line user behavior of the user by storing actions including at least one of whether an online purchase was made and an indication of web pages, other than a web page of the modified content, visited by the user.

9. The method of claim 8, wherein the data to capture includes a visitor ID, a query string in the HTTP request, and user profile data.

10. The method of claim 8, wherein the modification instruction comprises a modification instruction to insert a new control by:
  determining a location of the new control and attributes for the new control from the modification instruction; and
  inserting the new control and the attributes in the modified content at the location indicated by the modification instruction.

11. The method of claim 8, wherein the modification instruction comprises a modification instruction to remove a selected control by:
  removing the selected control from the modified content.

12. The method of claim 8, further comprising:
  determining attributes for controls in the modified content;
  generating an XML file from the modified control tree representation specifying a mapping of the modified content to HTML;
  sending the XML file and the modified content to an optimizer, the optimizer displaying the modified content and modifiable attributes of controls in the modified content based on the XML file;
  receiving an indication of a modification to an attribute of one of the attributes from the optimizer;
  further modifying the modified content to include the indication of the modification; and
  converting the further modified content to HTML.

13. A non-transitory computer readable medium having stored thereon machine readable code, the machine readable code when executed by a computer system causes the computer system to:
  receive, from a web server, an HTTP request from a user for content;
  request data capture instructions identifying data to capture based upon the HTTP request;
  receive the data capture instructions in response to the request for the data capture instructions, wherein the data to capture includes on-line user behavior related to on-line purchases associated with the user;
  capture the on-line user behavior in accordance with the received data capture instructions;
  transmit a content modification request message to an optimization service, the content modification request message including the request for content from the user and the captured on-line user behavior;
  in response to the transmitted content modification request message, receive from the optimization service:
    a control tree representation of the requested content, wherein the control tree representation includes a plurality of controls representing elements of the requested content; and
    a modification instruction comprising an indication to modify an attribute of an existing control of the plurality of controls in the control tree representation, wherein the optimization service determines the attribute of the existing control to modify based on the captured on-line user behavior;
  identify, within the control tree representation, the existing control to be modified;
  modify the attribute of the existing control in the control tree representation to generate a modified control tree representation in accordance with the modification instruction;
  convert the modified control tree representation to modified content in a user viewable format;
  send the modified content to the user via the web server;
  determine whether the data capture instructions include instructions to capture subsequent online user behavior after the modified content is delivered to the user; and
  in response to a determination that the data capture instructions include instructions to capture subsequent online user behavior after the modified content is delivered to the user, continue to capture and store the on-line user behavior and evaluate whether the modified content was effective in influencing the on-line user behavior of the user by storing actions including at least one of whether an online purchase was made and an indication of web pages, other than a web page of the modified content, visited by the user.

14. The non-transitory computer readable medium of claim 13, wherein the modification instruction is to insert a new control in the modified content and the machine readable code is to cause the computer system to:
  determine a location of the new control and attributes for the new control from the modification instruction; and
  insert the new control and the attributes in the modified content at the location indicated by the modification instruction.

15. The non-transitory computer readable medium of claim 13, wherein the modification instruction is to remove a control from the modified content, and the machine readable code to cause the computer system to modify the control is to cause the computer system to:
  remove the control from the modified content.

16. The non-transitory computer readable medium of claim 13, wherein the machine readable code is to further cause the computer system to:
  determine attributes for control in the modified content;

generate an XML file from the modified control tree representation specifying a mapping of the modified content to HTML;

send the XML file and the modified content to an optimizer, the optimizer to display the modified content and indicate modifiable attributes of controls in the modified content based on according to the XML file;

receive an indication of a modification to an attribute of one of the attributes from the optimizer;

further modify the modified content to include the indicated modification; and convert the further modified content to HTML.

17. The non-transitory computer readable medium of claim 13, wherein the data to capture includes a visitor ID, a query string in the HTTP request, and user profile data.

* * * * *